United States Patent [19]
Opfer

[11] Patent Number: 5,887,325
[45] Date of Patent: Mar. 30, 1999

[54] TRANSFER METHOD AND APPARATUS

[75] Inventor: Mark H. Opfer, Pemberville, Ohio

[73] Assignee: Glassline Corporation, Perrysburg, Ohio

[21] Appl. No.: 972,787

[22] Filed: Nov. 18, 1997

[51] Int. Cl.⁶ ..................................................... B23Q 7/14
[52] U.S. Cl. ...................... 29/33 P; 29/563; 198/346.1; 414/225; 451/412
[58] Field of Search ..................................... 29/33 P, 563, 29/564; 414/223, 225, 226; 198/346.1, 345.3; 409/198; 451/331, 412; 225/98

[56] References Cited

U.S. PATENT DOCUMENTS

| | | | |
|---|---|---|---|
| 3,561,618 | 2/1971 | Lindbom | 414/223 |
| 3,914,853 | 10/1975 | Jauch | 29/563 |
| 3,915,312 | 10/1975 | Clark | 414/225 |
| 4,422,265 | 12/1983 | Branston | 409/198 |
| 4,621,410 | 11/1986 | Williamson | 29/564 X |
| 4,697,318 | 10/1987 | Wilkham et al. | 29/33 P |
| 4,700,308 | 10/1987 | Jones | 29/564 X |
| 5,018,617 | 5/1991 | Miyata et al. | 29/33 P |
| 5,027,488 | 7/1991 | Lyerly et al. | 29/563 X |

*Primary Examiner*—William Briggs
*Attorney, Agent, or Firm*—Emch, Schaffer, Schaub & Porcello Co., L.P.A.

[57] ABSTRACT

This device includes a machine tool for cutting and breaking out parts such as a glass template, a positioning shuttle for moving the glass from the cutting station to the different grinders, and multiple grinders for grinding the edgework of the glass. The system uses standard cutting, break out, and grinder machine tools. The special part of the system is the shuttle that transfers the parts to the grinders without relocation. The shuttle maintains the fixed position of the blank with regard to the X, Y axis of the cutting station through the grinding operation.

22 Claims, 3 Drawing Sheets

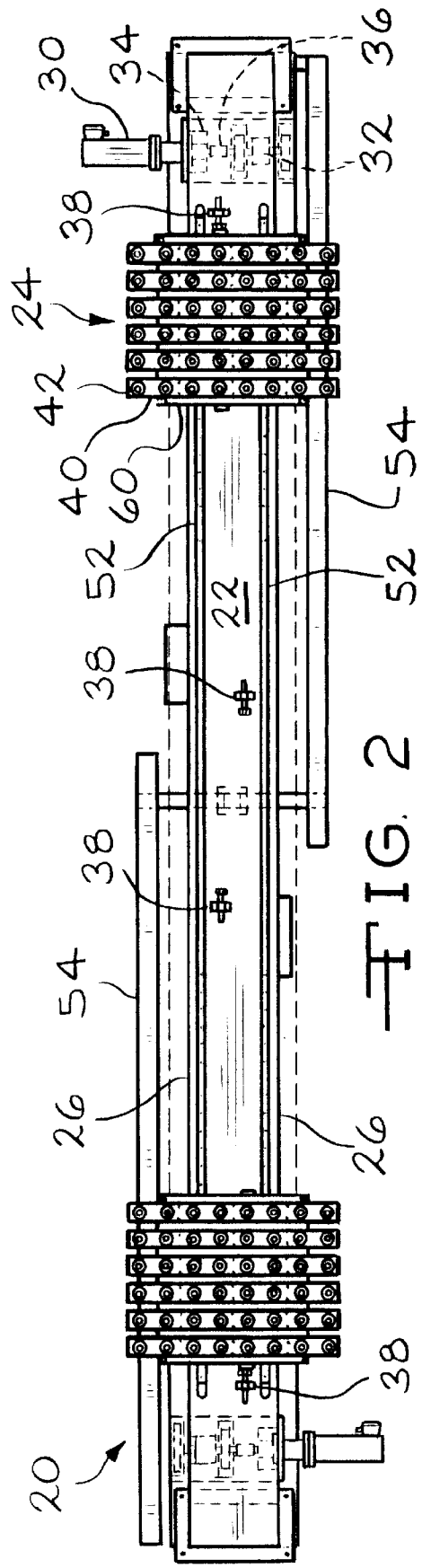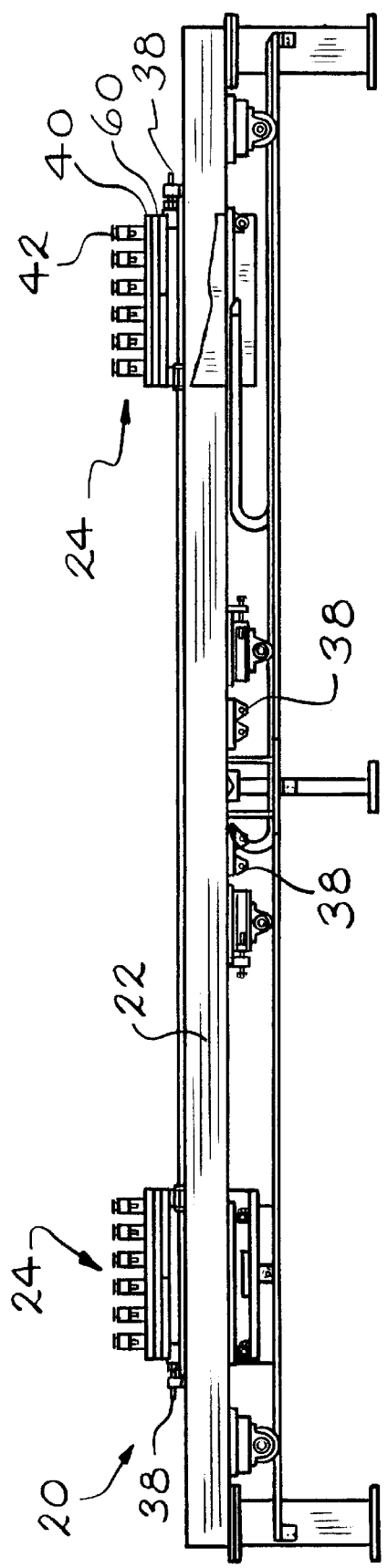

TRANSFER METHOD AND APPARATUS

TECHNICAL FIELD

This invention relates to a process and apparatus for transferring blanks such as glass plates without relocation. More specifically, the invention relates to transferring parts to multiple subsequent tooling stations from a single first tooling station.

BACKGROUND ART

Current systems in the industry require location stations to transfer blanks from one tooling station to another tooling station. For example, one cutting station cannot feed multiple grinding stations without having a relocation station at each grinding station. If more than one grinder is in the system, the glass parts are transferred from the cutter to locations stations for each grinder. The transfer is normally done with conveyors that only positions the glass well enough to fit in the location stations. Location stations are costly, complicated and subject to locator wear. Further, any transfer of glass blanks to a conveyor or conveyors looses all alignment. A transfer system that eliminates conveyors and relocation stations would be highly desirable and provide a high costs savings to the industry.

DISCLOSURE OF INVENTION

This invention includes a machine tool for cutting and breaking out a glass template, a positioning shuttle for moving the glass from the cutter station to the different grinders, and multiple grinders for grinding the edgework of the glass. The system uses standard cutting, break out, and grinder systems. The special part of the system is the underneath shuttle that transfers the parts to the grinder cell without relocation. My invention has many advantages over the prior art. First, location stations are expensive to build because of the accuracy requirements. This system eliminates the cost. Second, the location stations are complicated with many axis of motion and are subject to wear and breakdowns due to the sharp edges on cut glass. This system eliminates the maintenance of location stations. Most importantly, the system reduces changeover time by eliminating positioning errors due to locator wear or system miscalibration. Without positioning errors, the operators are not required to alter the machine parameters eliminating a time consuming step for part type changeovers.

After cutting and break-out, the glass blank has a fixed position with regard to its X, Y axis. The transfer system of this invention maintains this fixed position through the second tooling operation. A vacuum device transfers the glass blank from the cutting station to the shuttle of this invention. The vacuum device typically is an overhead vacuum disk or vacuum cup array which maintains the X, Y alignment of the cutting station. The vacuum device transfers the blank to a vacuum cup array (sled) on the shuttle. Vacuum timing overlaps so that alignment is not lost. The sleds in turn transfer the blank to another overhead vacuum disk which feeds each grinder. Again, vacuum times overlap so that the X, Y alignment of the cutter is maintained through the grinding station.

BRIEF DESCRIPTION OF THE DRAWINGS

FIG. 2 is a top plan view of the shuttle.

FIG. 3 is a side elevational view of the shuttle.

BEST MODE OF CARRYING OUT INVENTION

This invention is an apparatus for tooling multiple blank including one first machine tool performing a first tooling operation on the blanks, a multiplicity of second machine tools, each second tool performing a second tooling operation on the blanks, and a shuttle, the shuttle transferring blanks from the first machine tool to the second machine tools without lose of registration and without relocation. The first machine tool typically is a cutting tool or station. It is not restricted to standard turning or milling cutters, but also includes all mechanical, electronic and/or electro mechanical devices used to modify the shape and/or properties of the workpiece. Examples of cutting tools include: end-mills, turning tools, grinding wheels, laser cutting beams, plasma beams and punch tools.

The second machine tool typically is an edge grinding apparatus including at least one grinding wheel, at least one rotatable or linear holder for a blank, and at least one CNC device for controlling the grinding of the blank according to selected specifications. Besides the CNC grinders, my shuttle can be used with multiple stations of rotary can grinders, drilling machines and the like.

While I use the term glass blank, the term also covers materials other than glass. The blank can be any part, sheet, pane and the like depending upon the tooling operations involved.

Figure 1:
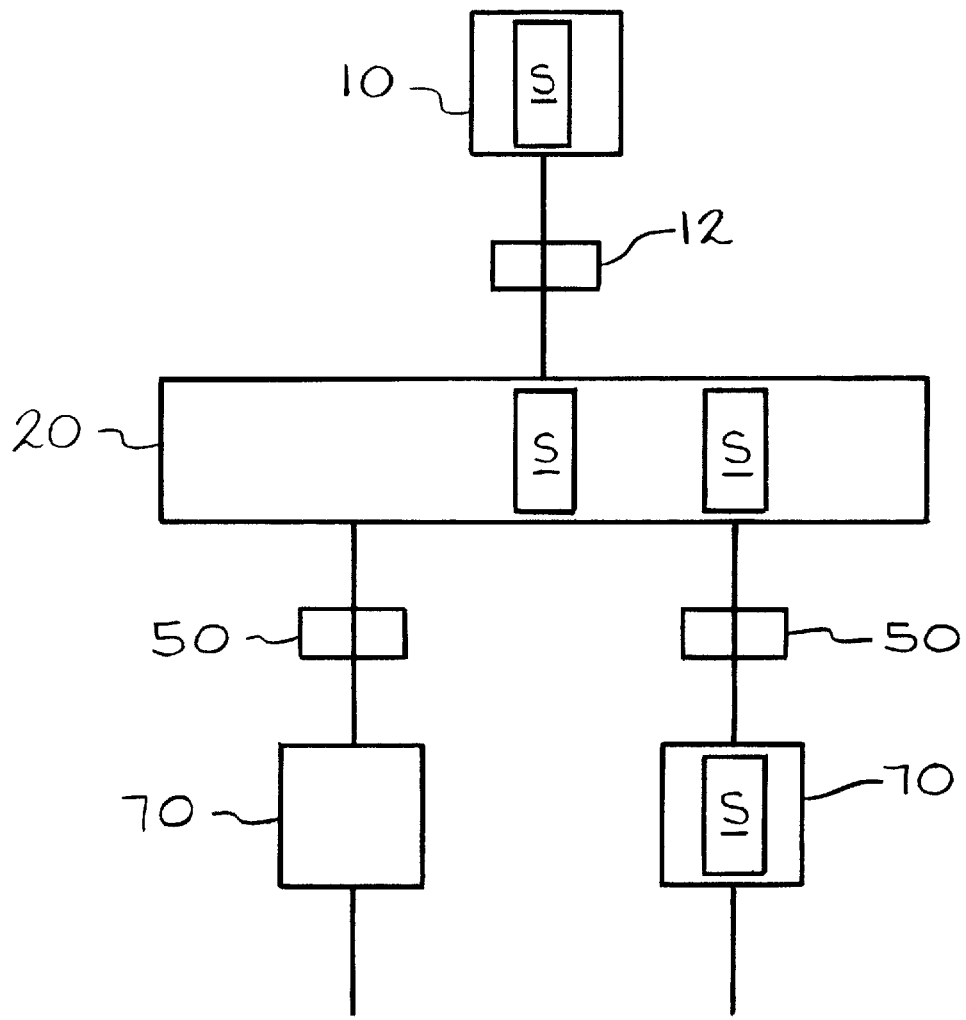
FIG. 1 is a schematic view showing a cutting station, multiple grinding stations and the shuttle of this invention.

Referring now to FIG. 1, it shows cutting tool 10 supplying blanks S to shuttle 20 which in turn supplies blanks S to grinders 70. Cutting tool 10 is any standard machine tool for cutting and breaking out a glass template. Grinders 70 typically are standard CNC glass grinding machines. Shuttle 20 transfers blanks S from cutting tool 10 to grinders 70 without relocation. Shuttle 20 is positioned transverse to the direction of the line and located between tool 10 and grinders 70.

Cutting tool 10 holds blank S in a specified X, Y axis alignment. Vacuum device 12 transfers blank S to shuttle 20 maintaining that X, Y alignment. Vacuum device 12 preferably is an overhead vacuum disk. Device 12, however, can be any vacuum table, sled or vacuum cup array. Maintaining X, Y alignment of blank S is the key.

Device 12 preferably uses vacuum. However, suction or other suitable holding mechanism may be used. Generally, device 12 includes a base which moves in a reversible linear direction between cutting tool 10 and shuttle 20. Device 12 moves along guides or rails. The base and guide rails generally have bearing surfaces and bearings allowing device 12 to slide back and forth in a straight line between cutting tool 10 and shuttle 20. An electric motor connected to the base of device 12 with gears, belt drives or chain drives typically move device 12 back and forth. A flexible tube attached to device 12 provides vacuum or suction.

Referring to FIGS. 2 and 3, shuttle 20 includes vacuum device 24, which preferably is at least two vacuum cup array tables or sleds. Linear precision alignment system 26 carries and supports vacuum device 24 on beam 22. In one embodiment system 26 is a track roller linear guidance system. Beam 22 typically supports load rails which have a cavity housing linear ball bearings. Grooved rollers are in freewheeling engagement with the ball bearings and grooves and are attached to brackets which support vacuum device 24. Other linear motion technology may be used. For example, one can use load rails supporting sleds using recirculating ball bearings. The sleds in turn carry vacuum device 24. Motor 30 drives device 24. Motor 30 connects to belt 32 through reducer 34. Coupling 36 connects reducer 34 to belt 32. Preferably, device 24 is a vacuum cup array. Vacuum cup array 24 has upper surfaces 40 which include a multiplicity of vacuum cups 42. Flexible power tube 44 connects to array 24 and provides vacuum thereto.

Stop 38 positions device 24 to receive blank S from overhead vacuum 12. Motor 30 than moves device 24 to stop 38. Device 24 holds its suction on blank S until vacuum device 50 begins suction. Device 24 then releases and motor 56 moves blank S to grinder 70.

Before vacuum cups 42 release vacuum, overhead vacuum disk 50 engages blank S. Cups 42 release and vacuum disk 50 moves blank S to grinders 70 without relocation. Device 50 is displaced along rails or guides and moves blank S into position at grinders 70. A motor drives device 50 via a reducer and a coupling. Device 50, grinder 70 and included equipment are referred to as the grinder cell.

Figure 4:
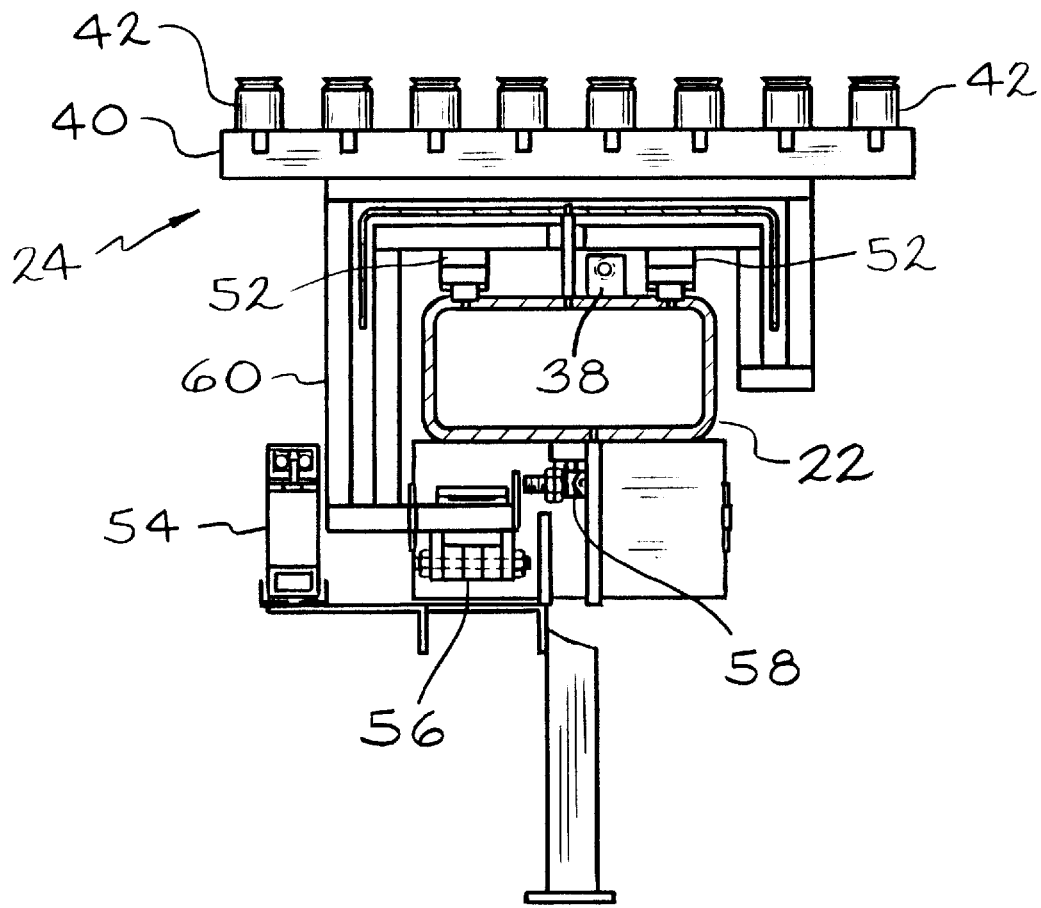
FIG. 4 is a cross-sectional view of the shuttle.

FIG. 4 is a cross-sectional view of shuttle 20 showing system 26 in greater detail. An end view of linear bearings 52 is shown, as well as an end view of stop 38. Power track 54 carries hoses, lines and the like. Roller 56 carries belt 32 and provides tension thereto. A pair of position limit switches slow down and stop sled 24. Frame 60 is a part of sled 24 and carries upper surface 40. Frame 60 is G-shaped and beneath surface 40.

While motors through the use of reducers and belts move the vacuum devices of this invention, these means are not critical to the operation. Air cylinders and other drive devices may be employed.

Device 50 preferably uses vacuum. However, suction or other suitable holding mechanism may be used. Generally, device 50 includes a base which moves in a reversible linear direction between shuttle 20 and grinders 70. Device 50 moves along guides or rails. The base and guide rails generally have bearing surfaces and bearings allowing device 50 to slide back and forth in a straight line between shuttle 20 and grinders 70. An electric motor connects to the base of device 50 with gears, belt drives or chain drives. A flexible tube attached to device 50 provides vacuum or suction.

I contemplate the shuttle feeding two or more grinders from one cutting tool. The key is one cutter per shuttle with multiple grinders and no relocation of the blank after cutting.

Each device 24 operates independently of the other vacuum devices on the shuttle. Naturally, co-operation and timing of device positioned at vacuum device 12 is necessary. While the preferred embodiment is independent operation, one motor and controls could operate multiple devices 24. Independent operation of vacuum devices 24 is desirable especially when grinding times vary greatly between grinding stations. Independent operation also is useful when cutting times vary greatly from grinding times. The independent operation allows for only one device 24 to operate with one grinder 70 if the other devices 24 or grinders 70 are down for maintenance or repair.

Managing alignment as this invention does is important because of the close tolerances the industry requires. The less glass removed during grinding, the better. Grinding operations strive for removing as little as 0.1 millimeters per side. Typically, operations remove as much as 0.3 mm per side and the industry often lives with 0.5 mm. With these close tolerances, even a misalignment of 0.01 degree will cause a part to be misground. If the grinding removes ¼ inch of glass, alignment would not be critical.

I claim:

1. An apparatus for tooling at least one blank including:
    one first machine tool having an X, Y axis and performing a first tooling operation on the blanks, wherein the blanks have a fixed position with regard to the X, Y axis of the first machine;
    a multiplicity of second machine tools, each second tool performing a second tooling operation on the blanks;
    a shuttle, the shuttle transferring blanks from the first machine tool to the second machine tools without realignment, wherein the shuttle has a multiplicity of separate vacuum devices;
    a first vacuum device for transferring a blank from the first machine tool to the vacuum device of the shuttle; and
    a second vacuum device for transferring a blank from the vacuum device of the shuttle to the second machine tool,
    wherein the first vacuum device, the second vacuum device and the vacuum devices of the shuttle essentially maintain the fixed position of the blank with regard to the X, Y axis of the first machine tool.

2. An apparatus according to claim 1 wherein the first machine tool is cutting machine tool for cutting and breaking out a glass template.

3. An apparatus according to claim 1 wherein the second machine tools are edge grinding machine tools.

4. An apparatus according to claim 1 wherein the blanks move in one direction and shuttle has a linear direction transverse to the direction the blanks move.

5. An apparatus according to claim 4 wherein the shuttle has a linear guidance system enabling the vacuum arrays of the shuttle to move in the linear transverse direction of the shuttle.

6. An apparatus according to claim 1 wherein the shuttle has stops which enable the vacuum devices of the shuttle to move back and forth between a position adjacent the first vacuum device and a position adjacent the second vacuum device.

7. An apparatus according to claim 1 wherein the first vacuum device is an overhead vacuum disk.

8. An apparatus according to claim 1 wherein the second vacuum device is an overhead vacuum disk.

9. An apparatus according to claim 1 wherein the shuttle is an underneath shuttle.

10. An apparatus according to claim 1 wherein the vacuum devices of the shuttle are vacuum tables having an upper surface comprising a multiplicity of vacuum cups.

11. An apparatus according to claim 1 wherein a separate drive moves each vacuum device of the shuttle independently of the other vacuum devices of the shuttle.

12. An apparatus according to claim 1 wherein the shuttle has a separate vacuum device for each second machine tool.

13. A process for tooling a multiplicity of blanks including the steps of:
    performing a first tooling operation on the blanks on one first machine tool having an X, Y axis, wherein the blanks have a fixed position with regard to the X, Y axis of the first machine;
    performing a second tooling operation on the blanks on a multiplicity of second machine tool;
    transferring the blanks from the first machine tool to the second machine tools without realignment on a shuttle, wherein the shuttle has a multiplicity of separate vacuum devices;
    transferring a blank from the first machine tool to the vacuum device of the shuttle with a first vacuum device; and
    transferring a blank from the vacuum devices of the shuttle to the second machine tool with a second vacuum device, wherein the first vacuum device, the second vacuum device and the vacuum devices of the shuttle essentially maintain the fixed position of the blank with regard to the X, Y axis of the first machine tool.

14. A process according to claim 13 wherein the first tooling operation cuts and breaks out a glass template.

15. A process according to claim 13 wherein the blanks have edges and the second tooling operation grinds the edges of the blanks.

16. A process according to claim 13 wherein the blanks move in one direction and shuttle moves in a linear direction transverse to the direction the blanks move.

17. A process according to claim 13 wherein the vacuum devices of the shuttle move back and forth between a position adjacent the first vacuum device and a position adjacent the second vacuum device.

18. A process according to claim 13 wherein the vacuum devices of the shuttle move independently of each other.

19. A process according to claim 13 wherein the vacuum devices of the shuttle engage the blanks before the first vacuum device releases vacuum.

20. A process according to claim 13 wherein the second vacuum device engages the blanks before the vacuum devices of the shuttle release vacuum.

21. A process according to claim 13 wherein the blanks have a bottom side, the shuttle is underneath the blanks and the vacuum devices of the shuttle engage the bottom side of the blanks.

22. A process according to claim 13 wherein the blanks have a top side, the first and second vacuum devices are overhead and the first and second vacuum devices engage the top side of the blanks.

* * * * *